United States Patent [19]

Yamamuro et al.

[11] Patent Number: 4,776,829
[45] Date of Patent: Oct. 11, 1988

[54] POWER TRANSMISSION BELT

[75] Inventors: Sigeaki Yamamuro, Zushi; Yoshiro Morimoto; Keiju Abo, both of Yokosuka, all of Japan

[73] Assignee: Nissan Motor Co., Ltd., Yokohama, Japan

[21] Appl. No.: 44,308

[22] Filed: Apr. 30, 1987

[30] Foreign Application Priority Data

Apr. 30, 1986 [JP] Japan ................. 61-100394
Apr. 30, 1986 [JP] Japan ................. 61-100393
Jun. 30, 1986 [JP] Japan ................. 61-152893
Jul. 21, 1986 [JP] Japan ................. 61-171181

[51] Int. Cl.$^4$ ............................. F16G 1/24
[52] U.S. Cl. ......................... 474/240; 474/245
[58] Field of Search ........... 474/237, 240, 242, 244, 474/245, 201

[56] References Cited

U.S. PATENT DOCUMENTS 2,038,583  4/1936  Maurer ................... 474/201
2,475,264  7/1949  Sutton ................... 74/245
3,720,113  3/1973  Van Doorne et al. ...... 474/242
3,949,621  4/1976  Beusink, deceased et al. .... 474/201
4,313,730  2/1982  Cole, Jr. et al. ........ 474/201
4,512,754  4/1985  Cole, Jr. et al. ........ 474/245
4,622,025  11/1986 Kern et al. ............. 474/242 X

FOREIGN PATENT DOCUMENTS 57-22442  2/1982  Japan .
59-144843 8/1984  Japan .

Primary Examiner—Thuy M. Bui
Attorney, Agent, or Firm—Foley & Lardner, Schwartz, Jeffery, Schwaab, Mack, Blumenthal & Evans

[57] ABSTRACT

A power transmission belt adapted for use in a pulley transmission, comprises a plurality of chains which are arranged in parallel with their pins of each chain positioned out of alignment with the pins of the adjacent chain, and a plurality of load blocks surrounding said plurality of chains. The load blocks functions to provide positive interference among vibrations of the chains so that the amplitude of vibration of the whole assembly is reduced.

20 Claims, 13 Drawing Sheets

POWER TRANSMISSION BELT

BACKGROUND OF THE INVENTION

The present invention relates to a power transmission belt for transmitting torque between two pulleys having a driving surface of generally V-shaped cross-section. The power transmission belt is particularly fit for use in a continuously variable transmission for an automotive vehicle.

There is known a power transmission belt as shown in U.S. Pat. No. 4,313,730 issued to Cole, Jr. et al on Feb. 2, 1982. This known power transmission belt comprises an assembly of a single chain constructed of a plurality of sets of interleaved links joined to its next adjacent set by a pin, and load blocks surrounding the chain and located between the next adjacent pins. Each of the load blocks fit over one set of links to be carried thereby. The load blocks are generally contoured at their edges to fit into the V of a pulley. When the load blocks are close together, the front and rear surface of at least some of the load blocks are tapered to permit articulation of the assembly.

This power transmission belt extends between two pulleys when, in use, a torque is to be transmitted between them. The chain of the belt articulates in a polygonal manner when it winds around each pulley. Thus, the trace drawn by each of the pins of the chain is not a part of a circle about the pulley rotation axis but a part of the polygon. In operation, the rotation of the driver one of the pulleys causes the load blocks to come into engagement with the driving surface of the pulley one after another. Let us now consider one pin joining two adjacent sets of interleaved links, the leading set carrying a load block which has come into engagement with the driving surface of the pulley, while the trailing set carrying a load block which is about to engage the driving surface of the pulley. Assuming that the running radius of the power transmission belt is R, the position assumed by this pin is expressed by the running radius R from the pulley rotation axis. After the pulley has rotated through an angle $\theta$ to let this pin advance half the pitch P (the pitch P = the distance between the adjacent two link pins), the pin assumes a position which is displaced radially outwardly of the running radius R by a radial distance $\Delta L$. This position is expressed by $R/\cos\theta$. Thus, the radial displacement $\Delta L$ after the advance by half the pitch is expressed by the following equation:

$$L = R/\cos\theta - R = R(1/\cos\theta - 1).$$

The angle $\theta$ is expressed by $\theta = \tan^{-1}(P/2R)$. Since, in the above mentioned manner, the pins of the chain moves radially outwardly away from the pulley rotation axis and then radially inwardly toward the pulley rotation as it rotates around the pulley, the chain is forced to vibrate in sinusoidal manner with an amplitude of $\Delta L$.

This vibration of the chain causes the load blocks to impinge upon the driving surface upon coming into engagement with the pulley, producing a periodical impinging sound. Since the overall length of the power transmission belt is invariable, the vibration causes the belt to elongate if the amplitude $\Delta L$ is relatively great. Owing to this vibration, the pulleys are forced to vary the distance therebetween, causing the input and output shafts to vibrate. The periodical impinging sound combines with the vibration of the shafts within a case surrounding the pulleys, causing the case to emit a relatively large noise outwardly.

Since the pitch of the chain is constant, the noise with the frequency corresponding to the first order of the pitch becomes considerably large.

The relationship between the pitch and the noise is such that the longer the pitch, the larger the amplitude becomes so that sound producing energy increases accordingly.

For example, assuming R = 50 mm, P = 8 mm, $\Delta L$ can be given as, $\Delta L = 0.16$ mm.

Assuming P = 4 mm, $\Delta L$ can be given as, $\Delta L = 0.04$ mm.

Therefore, the amplitude $\Delta L$ increases in proportion to the second power of the pitch P.

From the preceding description, it will be noted that in order to suppress the noise, the pitch of the chain should be shortened to decrease the radial component of the motion of the belt. However, the present chain design demands the pin diameter and the chain width to decrease as the pitch of the chain decreases. Thus, reducing the length of the pitch results in a reduction in the structural strength of the chain. Considering its use in an automotive vehicle having a 2000 cc internal combustion engine, the pitch of the chain can not be made shorter than a range from 9.5 mm to 8 mm.

SUMMARY OF THE INVENTION

According to the present invention, there is provided a power transmission belt adapted for use in a pulley transmission, which comprises:

a plurality of chains, each including a plurality of interleaved sets of links and means for joining each set of interleaved links to its next adjacent set of interleaved links to permit articulation thereof;

said plurality of chains being arranged in parallel with joining means of one of said plurality of chains out of alignment with joining means of the adjacent chain; and a plurality of load blocks surrounding said plurality of chains.

Since the plurality of chains are arranged as above mentioned, the vibrations of the chains with different phases positively interfere with each other via the load blocks in such a manner as to decrease the amplitude of vibration, thus causing the whole assembly to vibrate an amplitude smaller than the amplitude of individual vibration of each chain.

An object of the present invention, therefore, is to improve a power transmission belt of the type including a plurality of sets of interleaved links connected by joining means and load blocks such that, without decreasing the structural strength of each link, the amplitude of the vibration of the power transmission belt is reduced.

In the power transmission belt according to the present invention, each load block is positioned in substantial contact with one joining means of one chain and its adjacent one joining means of the next adjacent chain to transmit load to the joining means and thus to the links. In order to properly position each joining means, each load block is formed with recess means for receiving therein one joining means. Each recess means is formed in a front or rear surface of the load block and extends beyond the laterally opposite sides of one of a plurality of openings which are formed therethrough for receiving the set of inteleaved links of one of the plurality of chains.

According to one embodiment, each load block is formed with two openings, each for the set of links of one of two chains.

In order to receive joining means, each load block has one recess means formed in its front surface and extending beyond the laterally opposite sides of one opening. The other recess means is formed in a rear surface of the load block and extends beyond the laterally opposite sides of the other opening. Between the adjacent two joining means of each chain are positioned two load blocks. This arrangement is advantageous in that it is possible to set the frequency of the vibration noise at a level higher than any frequency falling in the audio-frequency range.

In the power transmission belt according to the present invention, each load block is formed with a plurality of openings, one receiving the set of links of one of the plurality of chains, another receiving the set of links of another of the plurality of chains and one joining means of the another chain. More specifically, the another opening of each load block includes laterally enlarged portions for receiving laterally extending end portions of the joining means.

In the power transmission belt according to the present invention, load blocks, each surrounding the plurality of chains, are positioned in substantial contact with one after another for slideable movement on the plurality of chains in longitudinal direction thereof. Each of the joining means of the one chain extends into a space defined between the adjacent two of said joining means of its next adjacent chain. When, in operation, the power transmission belt transmits a torque, the load is carried by the load blocks. Since each load block is mounted on the central portion of a set of links of one chain even if it is mounted on the end portion of the adjacent sets of links of another chain, the load blocks are urged to firmly engage the driving surface of the pulley.

In the power transmission belt according to the present invention, a plurality of chains consist of a central chain, a first group of side chains arranged on one lateral side of the central chain, and a second group of side chains arranged on the opposite lateral side of the central chain. Each joining means of one side chain of the first group is laterally aligned with one joining means of the corresponding chain of the second group, the one chain of the first group and the corresponding chain of the second group are positioned in substantial synmetrical relationship with respect to the center chain. Each load block is positioned in slidably on the plurality of chains in such a manner as to surround them. According to one embodiment, the plurality of chains consist of a central chain, a first side chain arranged on one lateral side of the center chain, and a second side chain arranged in parallel on the opposite lateral side of the central chain, the joining means of the first side chain being in alignment with the joining means of the second side chain although these joining means are out of alignment with the joining means of the central chain.

A specific object of the present invention is to provide a power transmission belt wherein a plurality of chains, each including a plurality of interleaved sets of links interconnected by joining means, and a plurality of load blocks, and wherein each of the load blocks is urged by the plurality of chains to securely engage the driving surface of each pulley.

DETAILED DESCRIPTION OF THE INVENTION

Figure 4:
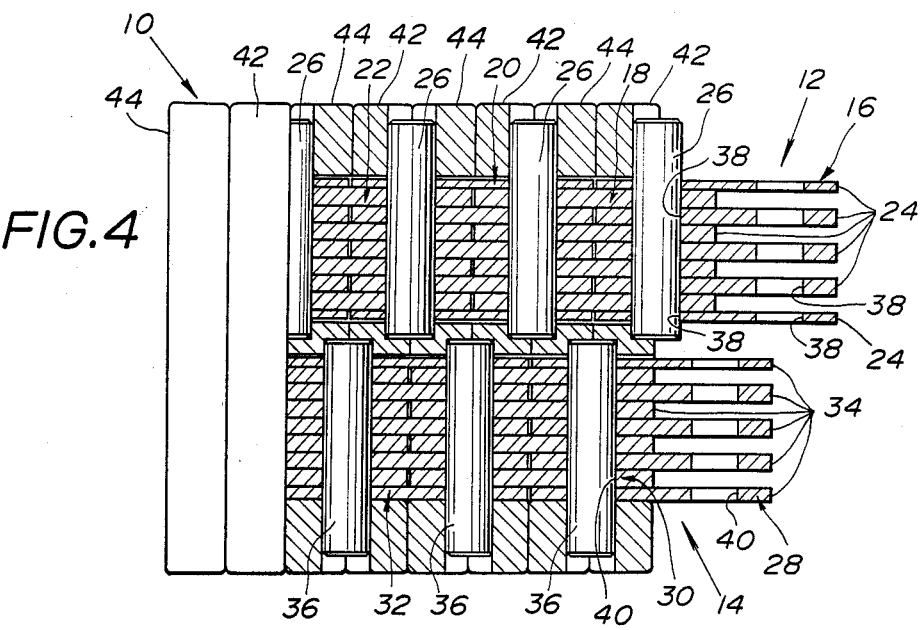
FIG. 4 is a partial sectional plan view of the structure of FIG. 2.
Figure 5:
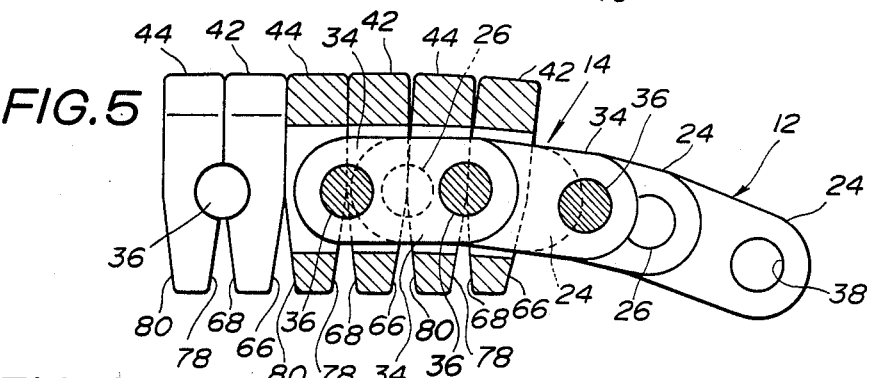
FIG. 5 is a side elevation of the structure of FIG. 2.

Attention is invited to FIGS. 1 to 6 of the drawings which illustrate one embodiment of the present invention. The power transmission belt generally identified as 10 comprises a first chain 12, and a second chain 14. The first chain 12 is an assembly of a plurality of sets 16, 18, 20, and 22 of interleaved links 24, the adjacent sets being connected by pins 26 which extend beyond the sides of the sets 16, 18, 20, and 22 of links 24. The second chain 14 is an assembly of a plurality of sets 28, 30, and 32 of interleaved links 34, the adjacent sets being connected by pins 36. As illustrated in FIG. 5, the links 24 and 34 have the same shape bounded by two parallel line segments interconnected by circular line segments. The links 24 each have a pair of pin receiving holes 38, while the links 34 each have a pair of pin receiving holes 40. Between each pin 26 of the chain 12 and its adjacent one of the pins 36 of the chain 14 is a load block 42 or a complementary load block 44.

The load blocks 42 each have two openings, one opening 46 loosely fitting over the set of links 24 of one chain 12, the other opening 48 loosely fitting over the set of links 34 of the other chain 14. The load blocks 42 each have opposite tapered sides or friction surfaces 50 and 52, adapted to contact pulley flanges 54 and 56 of pulley 58 and 60 and 62 of pulley 64. They are also tapered at 66 and 68 to permit articulation of the assembly. The load blocks 44 each have two openings, one opening 70 loosely fitting over the set of links 24 of one chain 12, the other opening 72 loosely fitting over the set of links 34 of the other chain 14. The complementary load blocks 44 each have opposite tapered sides or friction surfaces 74 and 76, adapted to contact pulley flanges 54 and 56 of pulley 58 and 60 and 62 of pulley 64. The tapered surfaces 50 and 52 and 74 and 76 are subject to heat treatment and surface finish to enhance their endurability. The blocks 44 are also tapered at 78 and 80 to permit articulation of the assembly. Referring to FIG. 4, between the adjacent two pins 26 of the first chain 12 are disposed one load block 42 and the complementary load block 44 such that these load blocks 42 and 44 have interposed therebetween the adjacent one pin 36 of the second chain 14. The pins 26 each are snugly fit in a cylindrical recess 82 of the load block 42 and the complementary cylindrical recess 84 of the complementary load block 44. The pins 36 each are snugly fit in a cylindrical recess 86 of the load block 42 and the complementary cylindrical recess 88 of the complementary load block 44. The thickness of each load block is chosen to be half the pitch of the first chain 10, i.e., the distance between the adjacent two pins 26 of the first chain 12. The first and second chains 12 and 14 therefore are arranged such that the pins 36 of the second chain 14 are positioned out of alignment with the pins 26, respectively, by half (½) the pitch of the first chain 12.

Figure 1:
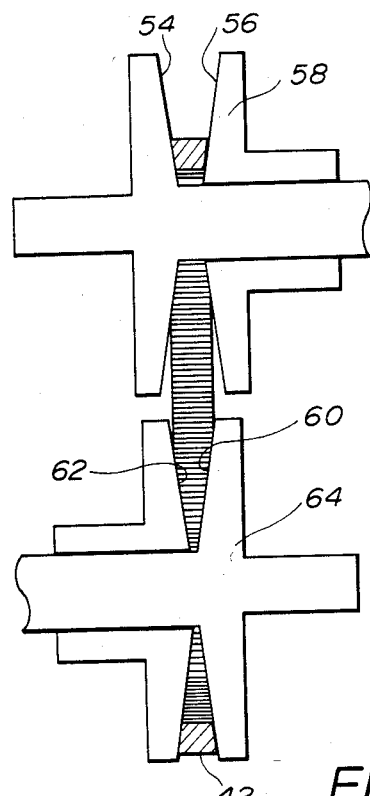
FIG. 1 is a partial sectional view of a power transmission belt showing a driver and driven pulley with which the power transmission belt is used.
Figure 3:
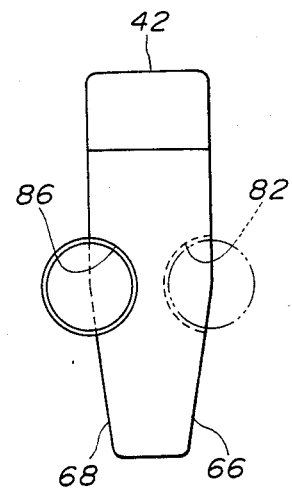
FIG. 3 is a side elevation of a load block used in the structure of FIG. 2.
Figure 2A:
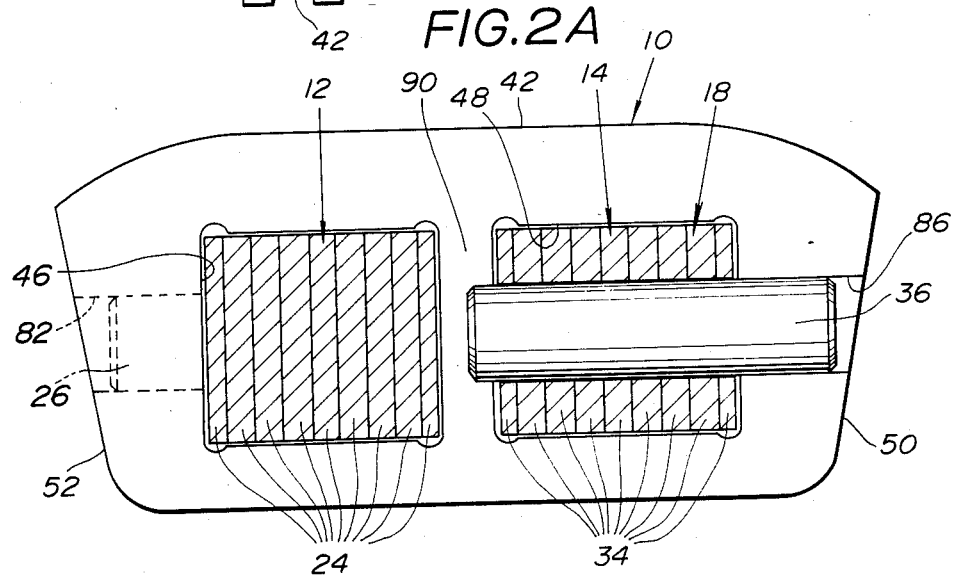
FIG. 2A is a partial cross-sectional view of a first embodiment of a power transmission belt according to the present invention illustrating a load block.

In order to permit the interleaved links 24 and links 34 commonly received by the same load block 42 or 44 to tilt within the openings 46 and 48, respectively, the size of these openings are chosen such that clearances are formed to allow such movement as will be readily understood from FIG. 2A and FIG. 5.

Figure 2B:
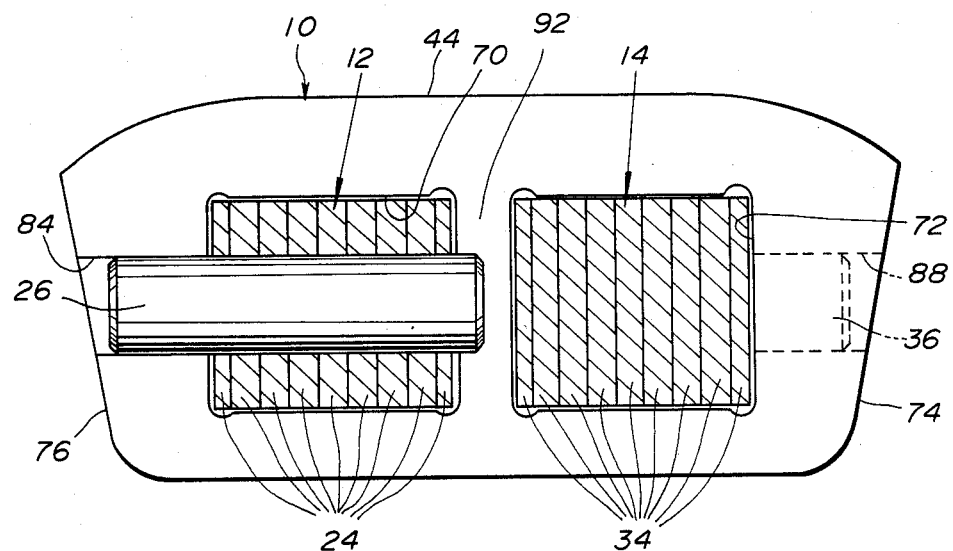
FIG. 2B is a partial cross-sectional view of a first embodiment of a power transmission belt according to the present invention illustrating a complementary load block.

As shown in FIGS. 2A and 2B, the one and the other openings 46 and 48 of the load block 42 and the one and the other openings 70 and 72 of the complementary load block 44 each has a top and a bottom spaced by a distance greater than the height of each of the links 24 and 34 so that clearances are formed above and below the sets of links 24 and 34. The openings 46, 48 and 70, 72 each have sides spaced by a distance greater than the width of the set of links 24 of the first chain 12 and the set of links 34 of the second chain 14 so that clearances are formed on opposite sides of the sets of the first and second chains 12 and 14. As will be understood from FIGS. 2A and 3, the cylindrical recesses 82 and 86 each are open at laterally outward ends but closed at laterally inward ends. Each cylindrical recess extends laterally inwardly beyond the inward side of the corresponding one of the openings 46 and 48. Similarly, as will be understood from FIG. 2B, the complementary cylindrical recesses 84 and 88 each are open at laterally outward ends but closed at laterally inward ends. The inward ends of the cylindrical recesses 82 and 86 and 84 and 88 are closed so as to ensure structural strength of central column 90 of the load block 42 and 92 of the load block 44. The links 24 and 34 are laterally restrained by the load blocks 42 and 44 since the end portions of each of the pins are interposed by the adjacent two load blocks 42 and 44. Relative movement of the pins 26 and 36 is restrained by press-fit of the pins between the cylindrical recesses 82 and 84 and 86 and 88 or caulking. Restraint of relative movement of each pin to the load block may be made by forming a step at the laterally outward end of the cylindrical recess and laterally inserting the pin inwardly beyond the step so that slip-out of the pin is prevented by abutting engagement of the laterally outward end of the pin with the shoulder formed by the step. The insertion of the pin is accomplished by moving the load block up and down relative to the set of links.

Figure 6:
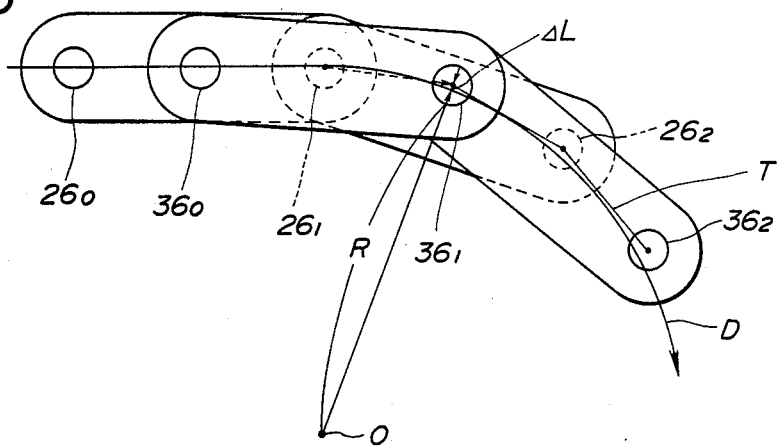
FIG. 6 is a diagrammatic view showing how links articulate about the pulley rotation axis 0.
Figure 7:
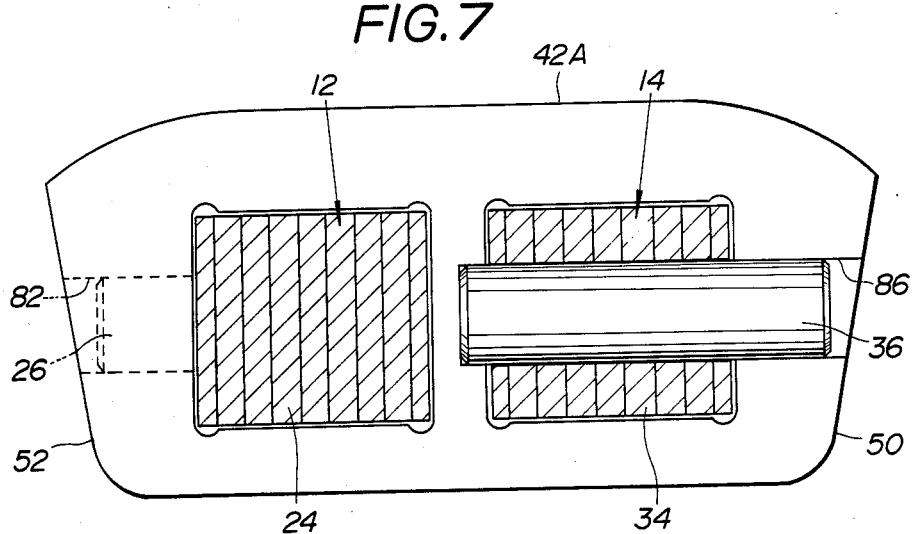
FIG. 7 is a partial cross-sectional view of a second embodiment of a power transmission belt according to the present invention.

Referring to FIG. 6, there is shown a portion of the power transmission belt 10 with all of the load blocks removed to illustrate how the links move as they rotate around the pulley. Each chain of the belt articulates in a polygonal manner when it rotates around the pulley. Thus, the trace drawn by each pin of the chain is not a part of a circle about the pulley rotation axis but a part of the polygon. In operation, the rotation of the pulley causes the load blocks to come into engagement with the driving surface of the pulley one after another. Let us now consider one pin joining two adjacent sets of interleaved links of one of the chains, the leading set carrying two load block which have come into engagement with the driving surface of the pulley, while the trailing set carrying two load blocks, the leading one load block of which is about to engage the driving surface of the pulley. Assuming that the running radius of the power transmission belt is R, the position assumed by this pin is expressed by the running radius R from the pulley rotation axis O. After the pulley has rotated through an angle $\theta$ to let this pin advance half the pitch P (the pitch P=the distance between the adjacent two link pins), the pin assumes a position displaced radially outwardly of the running radius R by a radial distance $\Delta L$. Since each pin of the chain moves radially outwardly away from the pulley rotation axis and then move inwardly toward the pulley rotation axis O, the chain tends to vibrate in sinusoidal manner with an amplitude of L. The pins 36 of the second chain 14 are positioned ½ pitch out of alignment with the adjacent pins 26 of the first chain 12, and two load blocks adjacent to each pin of the second chain 14 and carried by the two sets of links, respectively, are carried also by the adjacent set of links of the first chain 12 so that the load blocks act on both of the chains in such a manner as to suppress the radial displacement of the links and the amplitude of the vibration of the chains.

In FIG. 6, consider a pin $26_1$ of the first chain 12. This pin $26_1$ tends to move radially outwardly but this tendency is suppressed by two pins $36_0$ and $36_1$ of the second chain 14 because these two pins $36_0$ and $36_1$ act to urge the pin $26_1$ toward the pulley rotation axis O. Let us consider a pin $36_1$ of the second chain 14. The tendency of this pin $36_1$ to move radially outwardly is suppressed by two pins $26_1$ and $26_2$ of the first chain 12. As a result, the pins $26_1$ and $36_1$ trace a polygonal T with each line segment having substantially half (½) the pitch of each chain. The polygonal T closely follows the circular curve D traced by the transmission power belt 10.

From the preceding description, it will now be appreciated that with the pitch of each of the chains 12 and 14 maintained at sufficiently long, the assembly of the chains vibrates as if it had half (½) the pitch. Thus, this vibration has an amplitude L that is determined in proportion to the second power of ½ of the pitch. This amplitude is therefore far smaller than the known power transmission belt using a single chain having the same pitch. Further, since the same pitch is maintained, with maintaining the structural strength, the amplitude of vibration has been decreased so that the annoying periodical knocking noise produced by the load blocks impinging upon the pulley has been decreased.

Since two load blocks are carried between the two adjacent pins of each chain, the frequency of the knocking noise produced by the load blocks impinging upon the pulley becomes is set higher than any frequency falling in the audio-frequency range.

Figure 9:
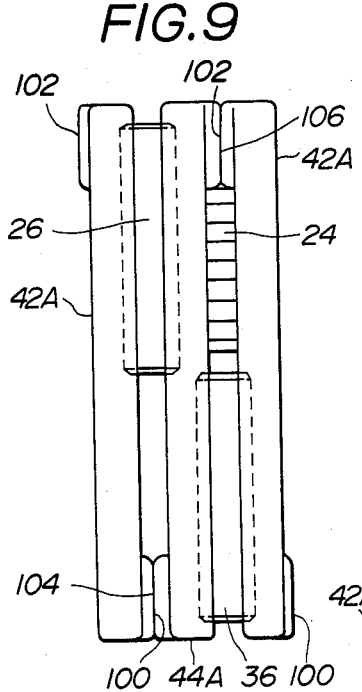
FIG. 9 is a plan view of the structure of FIG. 7.
Figure 8:
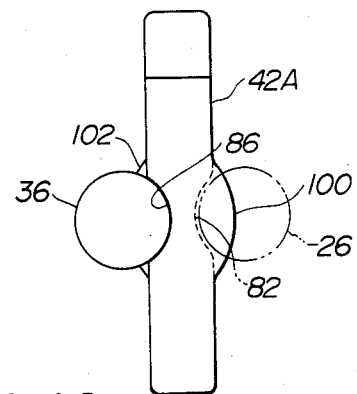
FIG. 8 is a side elevation, slightly reduced, of a load block used in the structure of FIG. 7.
Figure 10:
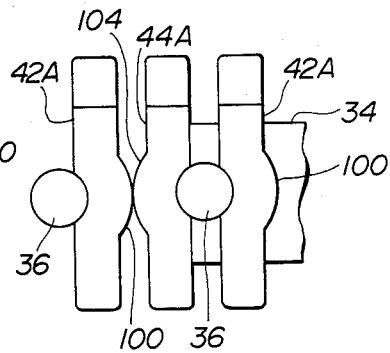
FIG. 10 is a side elevation of the structure of FIG. 7.

Alternative load blocks 42A and 44A are illustrated in FIGS. 7 to 10. The load blocks 42A and 44A are altenative to the load blocks 42 and 44 of the first embodiment shown in FIGS. 2A and 2B. Although the preciously described load blocks 42 and 44 are formed by forging, the alternative blocks 42A and 44A are formed by stamping from a sheet of steel. The alternative blocks 42A and 44A are easy to manufacture, light in weight and advantageous in cost as compared to the load blocks 42 and 44 of the first embodiment. Since the configuration of these alternative blocks 42A and 44A are substantially the same as the load blocks 42 and 44 of the first embodiment, the same reference numerals as used in the first embodiment are used to designate similar portions. However, as will be understood from comparison of FIG. 8 with FIG. 3, the load block 42A is not tapered but protruded to form bulges 100 and 102. These bulges 100 and 102 inevitably result from forming pin receiving recesses 86 and 82, respectively, by pressing a sheet of material metal. Similar bulges 104 and 106 are formed on the complementary load block 44A. As shown in FIGS. 9 and 10, the load blocks 42A and 44A are disposed between the adjacent two pins 36 of the second chain 14 with th-eir bulges 100 and 104 in a face-to-face relationship and with their recesses fitting over one of the pins 26 of the first chain 12 so that they can articulate.

Figure 11:
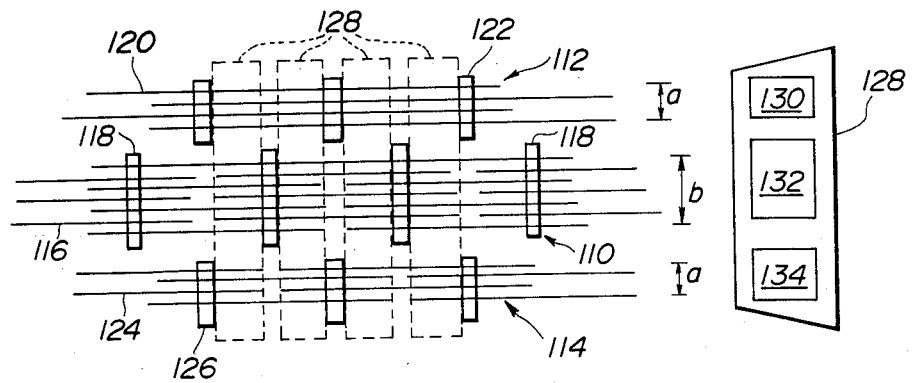
FIG. 11 is a diagrammatic plan view of a third embodiment of a power transmission belt using a load block shown on the right hand side thereof.
Figure 12:
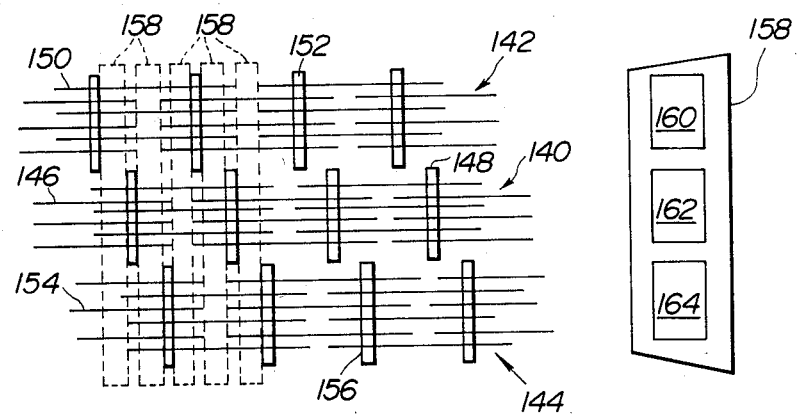
FIG. 12 is a diagrammatic plan view of a fourth embodiment of a power transmission belt using a load block shown on the right hand side thereof.
Figure 13:
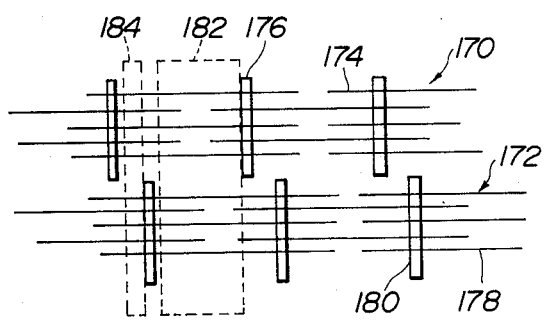
FIG. 13 is a diagrammatic plan view of a fifth embodiment of a power transmission belt using load blocks having which differ from each other in thickness.

FIGS. 11, 12 and 13 illustrate alternative chain and block assemblies.

Although in the preceding embodiments, the two chains 12 and 14 are bounded by the load blocks 42, 44 or 42A, 44A, the number of chains is not limited to two and it may be three or more.

FIG. 11 illustrates an example of three chains including a central chain 110, and two side chains 112 and 114 arranged side by side. The central chain 110 includes a plurality of sets of interleaved links 116, each connected to the adjacent set by a pin 118. The side chain 112 includes a plurality of sets of interleaved links 120, each connected to the adjacent set by a pin 122, while the other side chain 114 includes a plurality sets of links 124, each connected to the adjacent set by a pin 126. A plurality of load blocks 128 are provided, each formed with three openings 130, 132, and 134 for the set of links 120 of the side chain 112, the set of links 116 of the center main chain 110, and the set of links 124 of the other side chain 114, respectively. The dimensional relationship of the chains 110, 112, and 114 is such that the width of the set of links of each of the side chains 112 and 114 is a and the width b of the set of links of the central chain 110 is substantially equal to two times a (b=a+a). With the two load blocks 128 disposed between the adjacent two pin 118 with the pins 122 and 126 interposed therebetween, the side chains 112 and 114 are arranged with respect to the central chain 110 such that the pins 122 and 124 are alinged but out of alignment with the pins 118 of the main central chain 110 by half the pitch of the central chain 110.

FIG. 12 illustrates an example of three chains which have the same width and the same pitch. These three chains include a central chain 140 and two side chains 142 and 144. The central chain 140 includes a plurality of sets of interleaved links 146, each connected to the adjacent set by a pin 148. The side chain 142 includes a plurality of sets of interleaved links 150, each connected to the adjacent set by a pin 152, while the other side chain 144 includes a plurality sets of interleaved links 154, each connected to the adjacent set by a pin 156. A plurality of load blocks 158 are provided, each formed with three openings 160, 162, and 164 for the set of links 150 of the side chain 142, the set of links 146 of the center main chain 140, and the set of links 154 of the other side chain 144, respectively. With the three load blocks 158 disposed between the adjacent two pins 148 with the pins 152 and 156 interposed therebetween as shown in FIG. 12, the side chains 142 and 144 are arranged with respect to the center main chain 140 such that the pins 152, 148, and 156 are out of alignment one after another by one thirds of the pitch of the central chain 140.

FIG. 13 illustrates an example of two chains 170 and 172 which have the same width and the same pitch. The first chain 170 includes a plurality sets of interleaved links 174, each connected to the adjacent set by a pin 176, while the second chain 172 includes a plurality of sets of interleaved links 178, each connected to the adjacent set by a pin 180. Two different load blocks 182 and 184 are provided. The thick load block 182 and the thin load block 184 are positioned between the adjacent two pins 176 of the chain 170 with the adjacent one of the pins 180 of the chain 172 interposed therebetween. Thus, this arrangement provides a power transmission belt with the pins of the chains not equally distant in the longitudinal direction.

Figure 14:
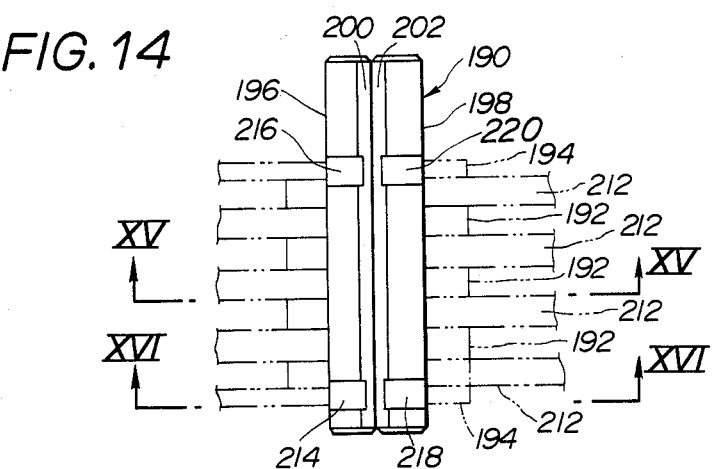
FIG. 14 is a plan view of a silent pin which may be used in the structures of power transmission belts according to the present invention.
Figure 15:
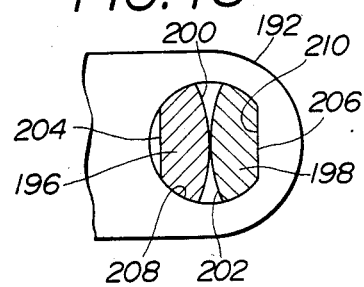
FIG. 15 is a cross-section taken through line XV—XV of FIG. 14.
Figure 16:
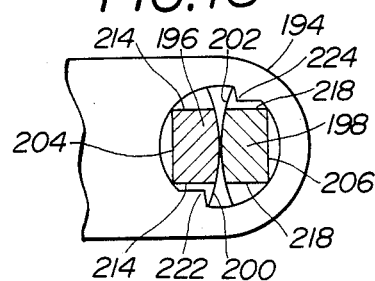
FIG. 16 is a cross-section taken though line XVI—XVI of FIG. 14.

An alternative pin 190 which is often called as a silent pin is illustrated in FIGS. 14 to 16. In using the silent pin 190, two different links 192 and 194 are used. The silent pin 190 is composed of two split parts 196 and 198 with their split surfaces 200 and 202 formed into cylindrical surfaces so the parts 196 and 198 are in rolling contact with each other. The parts 196 and 198 are flatted at 204 and 206, respectively. In order to fix the part 198 relative to the link 192, a pin receiving hole 208 of the link 192 is defined in part by a flat portion 210 engaged by the flatted portion 206 of the part 198. The other part 198 is fixed relative to a link 212 of the adjacent set with its flatted portion 204 engaged by a flat portion of the pin receiving hole of the link 212. Thus, the parts 196 and 198 of the silent pin 190 roll relative to each other to permit articulation of the set of links 192 relative to the adjacent set of links 212. The part 196 is formed with a first pair of radial grooves 214 at one end portion thereof and a second pair of radial grooves 216, while the part 198 is formed with a first pair of radial grooves 218 at one end portion thereof and a second pair of radial grooves 220 at the opposite end portion thereof. As best seen in FIG. 16, the bottom one of the pair of radial grooves 214 and the top one of the pair of radial grooves 218 receive a pair of diametrically opposed radial projections 222 and 224 of the link 194 extending into the pin receiving hole of the link 194. This arrangement prevents the slip-out of the silent pin 190, thus securing it in position. The thickness and material of the links 194 are chosen such that the radial projections 222 and 224 flex until they fit into the corresponding radial grooves, making the assembly easy. With the silent pins 190, the driving loss of the power transmission belt is minimized because the force is transmitted using the surfaces which are in rolling contact with each other.

Figure 17:
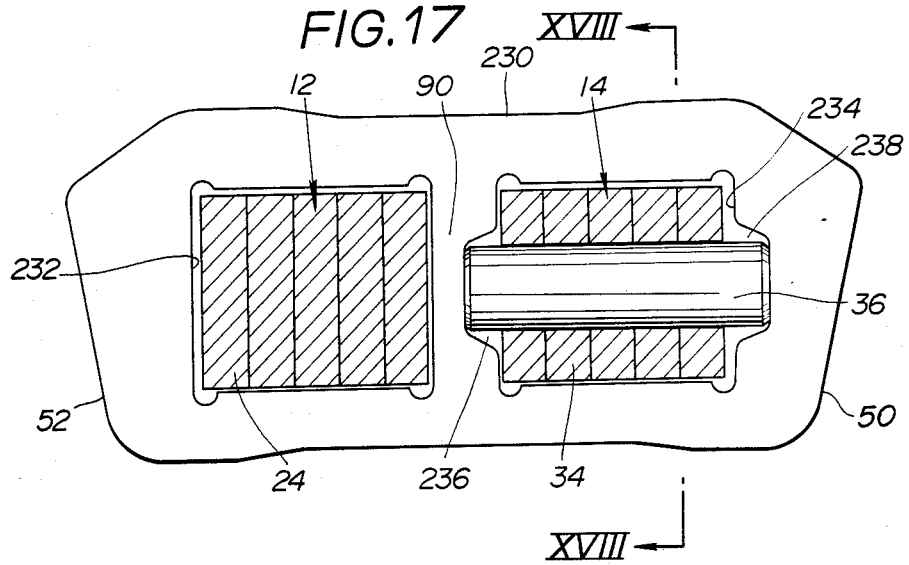
FIG. 17 is a partial cross sectional view of a sixth embodiment of a power transmission belt according to the present invention.
Figure 18:
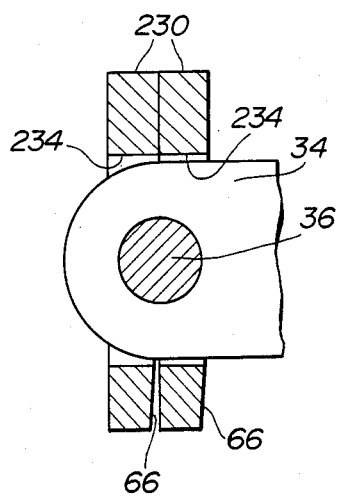
FIG. 18 is a cross-section through the line XVII—XVII of FIG. 17.
Figure 20:
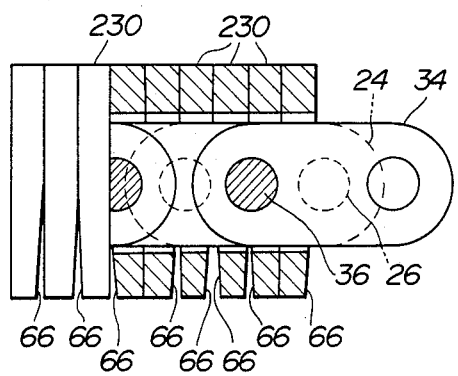
FIG. 20 is a partial sectional side view, slightly reduced, of the structure of FIG. 19.
Figure 19:
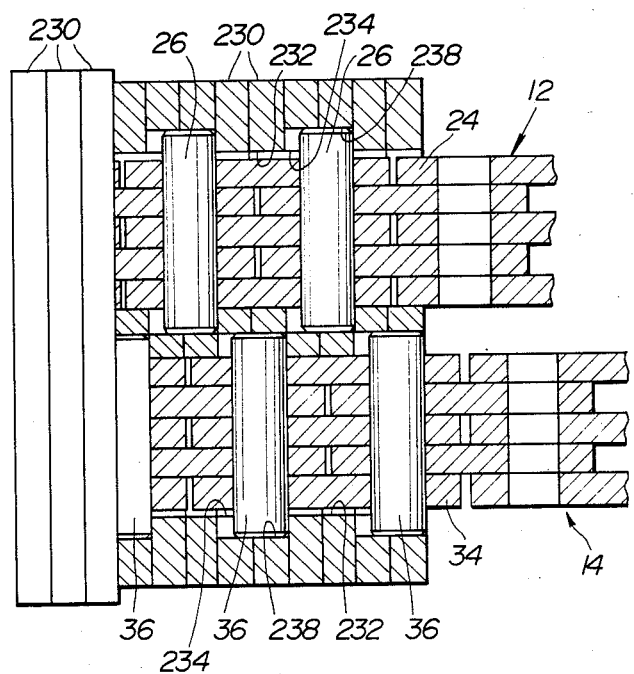
FIG. 19 is a partial sectional plan view of the structure of FIG. 17.

Alternative load block 230 is illustrated in FIGS. 17 to 20. This load block 230 is formed by stamping from a sheet of steel plate. Similarly to the load block shown in FIG. 2A, it is formed with two openings 232 and 234 fitting over the sets of links 24 and 34, respectively. However, as best seen in FIG. 17, as different from the load block 42 shown in FIG. 2A where the pin 36 is held in the recess 86, the pin 36 is disposed within the opening 234 with its laterally extending ends received within laterally enlarged portions 236 and 238 of the opening 234. As seen in FIGS. 18 and 19, two load blocks 230 are provided to surround the set of links 34 and its pin 36. For surrounding the set of links 24 and its pin 26, two load blocks 230 after having their left side turned to the right are assembled with their openings 234 fitting over the set of links 24 and its pin 26 and their openings 232 fitting over the set of links 34. The load blocks 230 each have opposite tapered sides or friction surfaces 50 and 52 adapted to contact pulley flanges of the pulleys (see FIG. 1). They are also tapered at 66 to permit articulation of the assembly.

Figure 21:
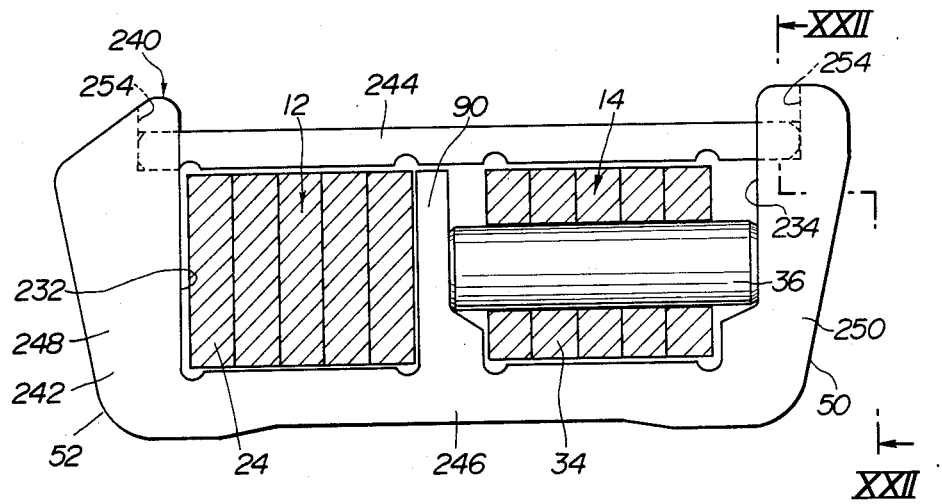
FIG. 21 is a partial cross-sectional view of the structure of FIG. 17 illustrating the last to be assembled load block.
Figure 22:
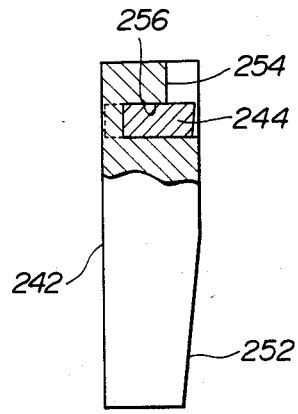
FIG. 22 is a cross-section taken through the line XXII—XXII of FIG. 21.
Figure 23:
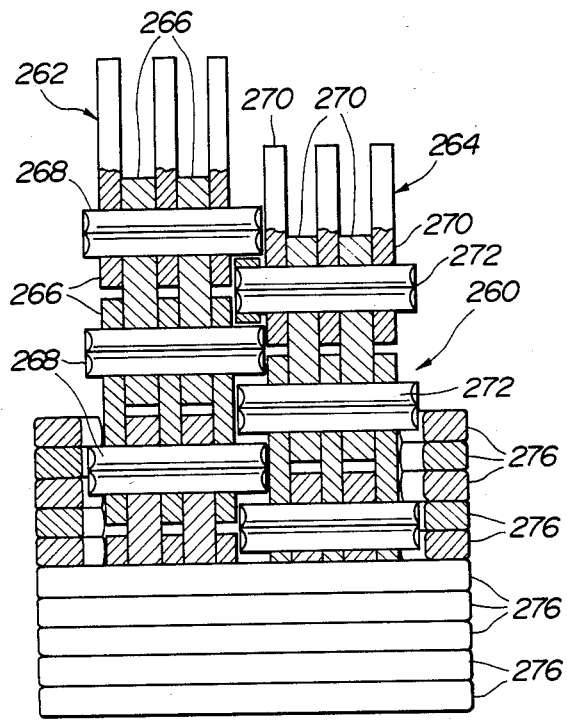
FIG. 23 is a partial sectional plan view of a seventh embodiment of a power transmission belt according to the present invention.

In assembly using the load blocks 230, a special load block 240 as illustrated in FIGS. 21 and 22 is required for the last to be assembled part. The load block 240 has a main body 242 and an elongate member 244. As will be understood from comparison of FIG. 21 with FIG. 17, the main body 242 is substantially the same in construction as load block 230 except that the elongate member 244 has replaced the top of the load block 230. Thus the main body 242 includes a bottom 246 and sides 248, 250, and it also includes a cental column 90. As seen in FIG. 12, the main body 242 is tapered at 252 to permit articulation.

As will be understood, the load blocks 230 are positioned during pinning of the sets of links 24 and 34. After the endless belt is completed after the pinning of the last pin, the main body 242 is positioned between the adjacent two load blocks 230 in such a manner as to receive the sets of links 24 and 34 of the chains 12 and 14 and then the elongate member 244 is inserted vertically as viewed in FIGS. 21 and 22 guide grooves 254 to fit horizontally into slots 256 with which the sides 248 and 250 are formed (see FIG. 22). Since it is inserted horizontally in the longitudinal direction of the chains 12 and 14, the elongate member 244 is not removed even when the adjacent two load blocks 230 are separated during the articulation of the power transmission belt.

Figure 24:
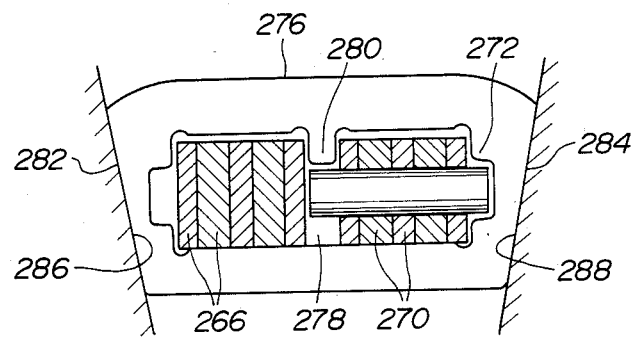
FIG. 24 is a partial cross-sectional view of the structure of FIG. 23.

FIGS. 23, 24, 25, 26, 27, and 28 illustrate another embodiment according to the present invention. A power transmission belt is generally designated by reference numeral 260 comprises a first chain 262 and a second chain 264. The first chain 262 includes a plurality of sets of interleaved links 266, the adjacent sets being connected by pins 268. The second chain 264 includes a plurality of sets of interleaved links 270, the adjacent sets being connected by pins 272. The pins 268 and 272 are constructed of a silent pin which has been described in connection with FIGS. 14, 15 and 16. In order to position the pins 272 of the second chain 264 out of alignment with the pins 268 of the first chain 262 by half the pitch of the first chain 262, each of the pins 272 extends into a space between the adjacent two pins 268 of the first chain 262 such that it is interposed by them. Preferably bushings, only one being shown and designated by 274, fit around the end portions of the pins 268 or 272 to fill the clearances between them so that relative movement between the chains 262 and 264 in the longitudinal direction is prevented. Load blocks 276 laterally surround the first and second chains 262 and 264. As best seen in FIG. 24, the load block 276 is formed with a common opening loosely fitting over the set of links 266 and the set of links 270 and includes a projection 280 extending into the opening 278. This projection 280 functions to separate the set of links 266 from the adjacent set of links 270 so that the relative movement of the chain 266 with the chain 268 in their pinning direction is prevented. The load block 276 has opposite tapered sides 282 and 284 adapted to contact pulley flanges 286 and 288. Since the common opening 278 of each of the load blocks 276 can fit over the sets of links together with their pins, the load blocks are slidably positioned one after another after the chains 262 and 264 are almost assembled except the pinning of the last pin.

Figure 27:
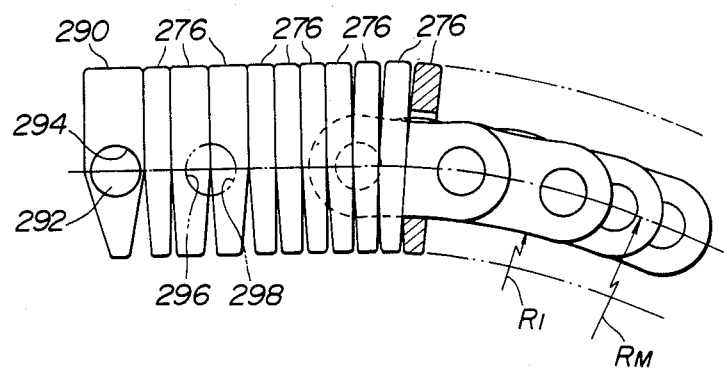

A special load block 290 as illustrated in FIG. 27 is required for the pinning of the last pin which is indentified as 292. This special load block is formed with a pin receiving hole 294. Since it must be drilled to form the pin receiving hole 294, this special load block 290 inevitably is thicker than the other ordinary load blocks 276. If it is not desired to use this special load block 290, two adjacent load blocks 276 are formed with cylindrical recesses 296 and 298 within the mutually facing surfaces thereof in order to receive the last pin 292 (See FIG. 27).

Figure 25:
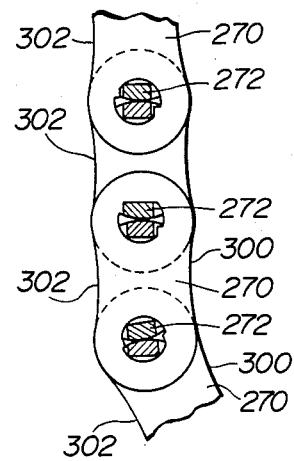
FIG. 25 is a side view of a portion of a side chain.
Figure 26:
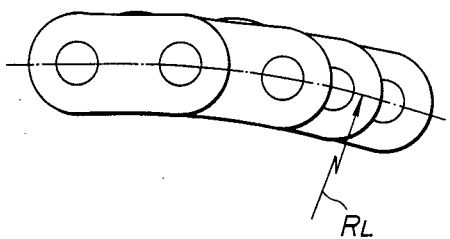
FIGS. 26, 27, and 28 are diagrammatic views showing how links used in the structure of FIG. 23 articulate in different cases.
Figure 28:
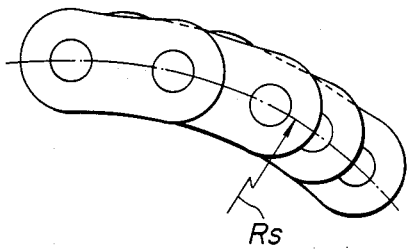

As will be understood from FIG. 25, the links 270 have an inward boundary 300 concavely secuvred and an outward boundary 302 concavely curved. The links 266 are the exactly the same as the links 270. The radius $R_1$ of curvature of this inward boundary 300 is determined as follows. Attention is now invited to FIGS. 26, 27 and 28. FIG. 27 is a diagrammatic view of the case where the pulley transmission ratio is 1:1 and the running radius of the power transmission belt is $R_M$. FIG. 26 illustrates the case where the running radius $R_L$ is greater than the radius $R_M$, while FIG. 28 illustrates the case where the running radius $R_S$ is smaller than the running radius $R_M$. The radius of curvature $R_1$ should be determined such that when the running radius is $R_M$, the inward boundaries of the links define a part of circle which is concentric with the circle defined by the running radius $R_M$. For ease of control of parts, it is preferable to have the outward boundary to be concavely curved with the same radius of curvature $R_1$.

Although in the embodiment just described in connection with FIGS. 23 to 28, two chains 262 and 264 are used, the number of chains is not limited to two and it may be more than two.

Figure 29:
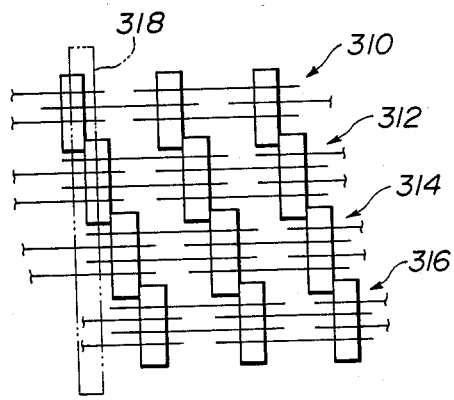
FIG. 29 is a diagrammatic plan view of a eighth embodiment of a power transmission belt according to the present invention.

FIG. 29 illustrates an example where four chains 310, 312, 314, and 316 are arranged in parallel with their pins in rolling contact one after another. More specifcally, load blocks, only one being shown in phantom and identified as 318, fit over all of the chains laterally and positioed slidably and longitudinally.

Figure 30:
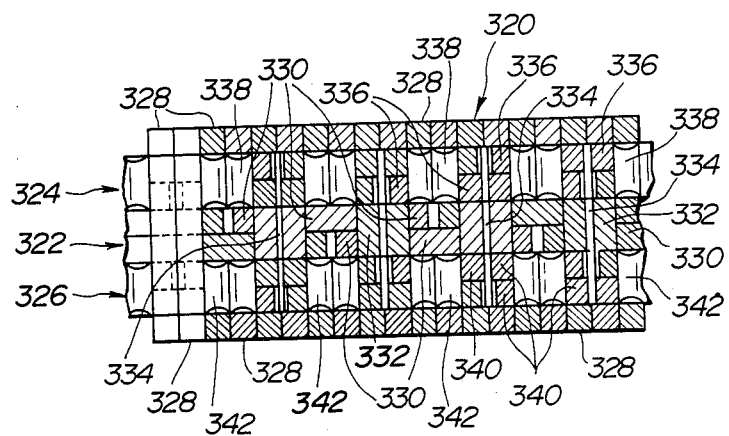
FIG. 30 is a partial sectional plan view of a ninth embodiment of a power transmission belt according to the present invention.
Figure 31:
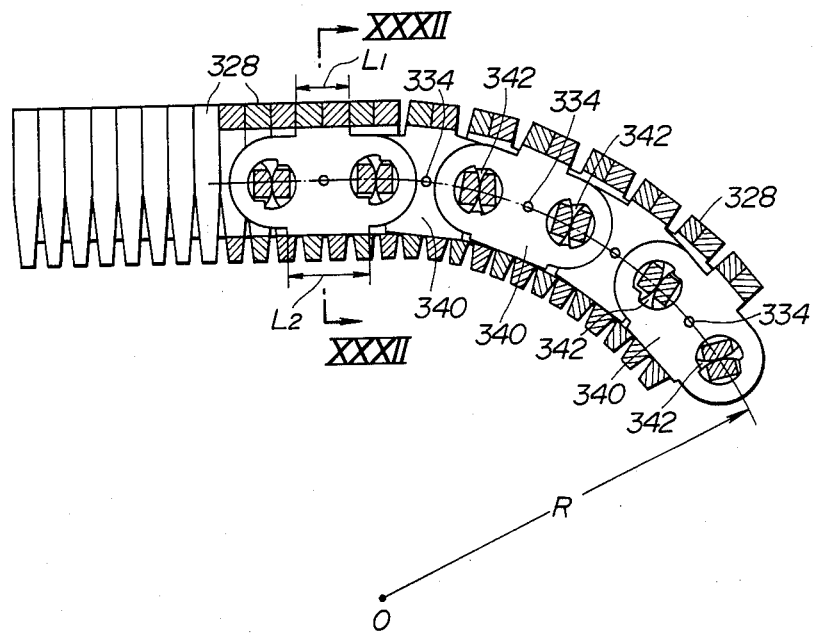
FIG. 31 is a partial sectional side view of the structure of FIG. 30.
Figure 32:
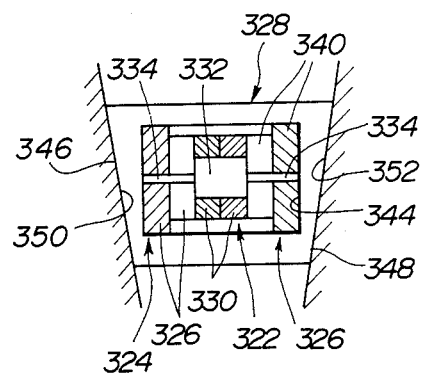
FIG. 32 is a partial cross-sectional view of the structure of FIG. 30.

FIGS. 30, 31, and 32 illustrate a still another embodiment of the present invention which comprises a power transmission belt 320. The power transmission belt 320 includes a central chain 322 and two side chains 324 and 326, and load blocks 328 surrounding all of the chains 322, 324 and 326. The central chain 322 includes a plurality sets of interleaved links 330, the adjacent sets being interconnected by cylindrical pins 332. Each of the cylindrical pins 332 is hollowed to allow the passage of a connecting rod 334 which is used to connect the side chains 324 and 326 to the central chain 322. The side chain 324 includes a plurality of interleaved links 336, the adjacent sets being connected by so-called silent pins 338 which have the same construction as described in connection with FIGS. 14, 15, and 16. The links 336 of the side chain 324 is formed with a central opening through which one end portion of the connecting rod 334 extends. The other side chain 326 includes a plurality of interleaved links 340, the adjacent sets being connected by so-called silent pins 342 which are constructed as described in connection with FIGS. 14, 15, and 16. The links 340 each is the same as the link 336 and formed with a central opening allowing the passage of the opposite end portion of the connecting rod 334. As will be understood from FIG. 30, since the connecting rods 334 carried by the cylindrical pins 332 of the central chain 322 each have the opposite end portions inserted into the links 336 and 340 of the both side chains 324 and 326, the silent pins 338 of the side chain 324 are positioned in alignment with the silent pins 342 of the other side chain 326, and the silent pins 338 and 342 are positioned out of alignment with the cylindrical pins 332 of the centeral chain 322 by half the pitch of the central chain 322.

As best seen in FIG. 32, each of the load blocks 328 is formed with a common opening 344 fitting over the centeral chains 322 with the side chains 324 and 326. The load block 328 includes the opposite tapered sides 346 and 348, adapted to contact pulley flanges 350 and 352. As will be understood, the load blocks 328 are positioned slidably and longitudinally on the assembly of the central and side chains 322, 324 and 326.

The links 330, 336 and 340 have the same profile. Describing further taking the links 340 of the side chain 326 as an example, the links each are contoured such that the outward periphery contacts the edges of the openings 343 of the adjacent load blocks 328 along a predetermined length $L_1$ which is the same as the outer diameter of the pins 332, 338, and 342, while the inward peripery contacts the edges of the openings 344 of the adjacent load blocks 328 along a length $L_2$ which is longer than the above mentioned length $L_1$.

According to this embodiment, the pins of the side chains are positioned in alignment relationship and the relative longitudinal movement of the side chains to the centeral chain is prevented by the connecting rods so that the load blocks are not subject to any bending stress and thus snaking of the power transmission belt is effectively prevented.

What is claimed is:

1. A power transmission belt adapted for use in a pulley transmission, comprising:
    a plurality of chains, each including a plurality of interleaved sets of links and means for joining each set of interleaved links to its next adjacent set of interleaved links to permit articulation thereof;
    said plurality of chains being arranged in parallel with joining means of one of said plurality of chains positioned out of alignment with the joining means of the next adjacent chain;
    a plurality of load blocks surrounding said plurality of chains.

2. A power transmission belt as claimed in claim 1, wherein each load block is positioned in substantial contact with one joining means of said one of said plurality of chains and its adjacent one joining means of the adjacent chain to transmit load to said joining means and thus to said links.

3. A power transmission belt as claimed in claim 2, wherein each load block is formed with a plurality of openings, each receiving the set of links of one of said plurality of chains.

4. A power transmission belt as claimed in claim 3, wherein each load block has at least one recess receiving therein at least part of one joining means.

5. A power transmission belt as claimed in claim 3, wherein each load block has recess means for receiving therein one joining means, each recess means being formed in one of front and rear surface of the load block and extends beyond the laterally opposite sides of one of said plurality of openings.

6. A power transmission belt as claimed in claim 2, wherein each load block is formed with two openings, each receiving the set of links of each of said plurality of chains.

7. A power transmission belt as claimed in claim 6, wherein each load block has recess means for receiving therein one joining means, one recess means being formed in a front surface of the load block and extending beyond the laterally opposite sides of one of said plurality of openings, the other recess means being formed in a rear surface of the load block and extending beyond the laterally opposite sides of the other opening.

8. A power transmission belt as claimed in claim 7, wherein the adjacent two load blocks are positioned between the adjacent two joining means of each chain.

9. A power transmission belt as claimed in claim 8, wherein each load block is formed by forging.

10. A power transmission belt as claimed in claim 8, wherein each load block is formed by stamping from a sheet of steel.

11. A power transmission belt as claimed in claim 1, wherein each load block is formed with a plurality of openings, one receiving the set of links of one of said plurality of chains, another receiving the set of links of another of said plurality of chains and one joining means of said another chain.

12. A power transmission belt as claimed in claim 11, wherein said another opening of each load block includes laterally extending portions for receiving laterally extending end portions of said one joining means of said another chain.

13. A power transmission belt as claimed in claim 12, further comprising a load block, which is required for the last to be assembled, having a main body of a bottom and sides and an elongate member joining the sides, said main body further including means defining between the sides thereof a plurality of cutouts adapted to receive the sets of links.

14. A power transmission belt as claimed in claim 1, wherein each load block is positioned in substantial contact with its next adjacent one load block and surrounding said plurality of chains.

15. A power transmission belt as claimed in claim 14, wherein each joining means of the one chain extends into a space defined between the adjacent two of said joining means of its next adjacent chain.

16. A power transmission belt as claimed in claim 15, wherein each set of inteleaved links have an inward boundary concavely curved.

17. A power transmission belt as claimed in claim 16, wherein each set of interleaved links have an outward boundary concavely curved.

18. A power transmission belt as claimed in claim 1, wherein said plurality of chains consist of a central chain, a first group of chains arranged on one lateral side of the central chain, and a second group of chains arranged on the opposite lateral side of the center chain, the joining means of one chain of the first group being aligned with the joining means of the corresponding chain of the second group, the one chain of the first group and the corresponding chain of the second group are positioned in substantial synmetrical relationship with respect to the central chain. and wherein each load block is positioned in substantial contact with its next adjacent one load block and surrounds said plurality of chains.

19. A power transmission belt as claimed in claim 1, wherein said plurality of chains consist of a central chain, a first side chain arranged on one lateral side of the central chain, and a second side chain arranged on the opposite lateral side of the central chain, the joining means of the first side chain being position in alignment with the joining means of the second side chain, the joining means of said first and second chains being positioned in out of alignment with the joining means of said central chain, and wherein each load block is positioned in substantial contact with its next adjacent one load block and surrounds said plurality of chains.

20. A power transmission belt as claimed in claim 19, wherein each joining means of one chain has a predetermined diameter, and each set of interleaved links of the one chain are coutoured such that the outward periphery thereof contacts the adjacent load blocks along a length substantially the same as the predetermined diameter, and the inward periphery thereof contact the adjacent load blocks along a length longer than said predetermined diameter.

* * * * *